US012804382B2

(12) United States Patent
Nandigam et al.

(10) Patent No.: US 12,804,382 B2
(45) Date of Patent: Nov. 17, 2026

(54) SEAMLESS eSIM SHARING FRAMEWORK

(71) Applicant: T-Mobile USA, Inc., Bellevue, WA (US)

(72) Inventors: Anjani Deepthi Nandigam, Bothell, WA (US); Nilesh Ranjan, Sammamish, WA (US); Anthony Yiu, Newcastle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 273 days.

(21) Appl. No.: 18/796,220

(22) Filed: Aug. 6, 2024

(65) Prior Publication Data

US 2026/0046605 A1 Feb. 12, 2026

(51) Int. Cl.
*H04W 8/20* (2009.01)
*H04W 8/26* (2009.01)

(52) U.S. Cl.
CPC ............ *H04W 8/205* (2013.01); *H04W 8/26* (2013.01)

(58) Field of Classification Search
CPC ................................ H04W 8/205; H04W 8/26
USPC .......................................................... 455/418
See application file for complete search history.

(56) References Cited

U.S. PATENT DOCUMENTS

2018/0109676 A1* 4/2018 Yeoum ................. H04B 7/0413
2025/0088845 A1* 3/2025 Nitsch ................. H04L 63/0853

OTHER PUBLICATIONS

Apple Support, "About eSIM on iPhone," retrieved at https://support.apple.com/en-us/118669, Apr. 29, 2024, 5 pages.
Wikipedia, "eSIM," retrieved at https://en.wikipedia.org/wiki/ESIM, Apr. 29, 2024, 5 pages.
Saily, "eSIM for United States," retrieved at https://saily.com/esim-united-states/, Jul. 11, 2024, 7 pages.
Saily, "eSIM—what is it and how it works," retrieved at https://saily.com/what-is-esim/, Jul. 11, 2024, 8 pages.

* cited by examiner

*Primary Examiner* — Chuck Huynh
(74) *Attorney, Agent, or Firm* — Foley IP Law, PLLC

(57) ABSTRACT

Embedded subscriber identity modules (eSIMs) may be shared among multiple user equipment (UE). Each UE has a SIM chip that has a unique embedded identity document (EID), and each eSIM has a unique integrated circuit card identifier (ICCID) and an associated mobile station international subscriber directory number (MSISDN, e.g., phone number). When the eSIMs are moved among UEs, the ICCID remains consistent for the eSIM, and the MSISDN may also remain consistently associated with a particular eSIM. Each eSIM has an associated profile that identifies authorized UEs that have permission to employ that eSIM, and may further identify usage restrictions (e.g., data usage, authorized networks and/or geographical limits) and a state, such as "in use" (when in a UE) and "not in use" when in storage. Organizations may maintain a pool of eSIMs, with the eSIMs moved among employees based on travel assignments and/or need for a company-provided phone.

20 Claims, 9 Drawing Sheets

SEAMLESS eSIM SHARING FRAMEWORK

BACKGROUND

Wireless networks, such as cellular networks, use a subscriber identity module (SIM) that is associated with a cellular user account, and identifies a user equipment (UE) to a network as also associated with the user account so that the network can provide the proper services (e.g., data plans, associating with a phone number for incoming and outgoing calls, etc.). A SIM may be a physical SIM (pSIM) or an embedded SIM (eSIM), which does not have a physical form, but is stored on a special SIM chip (i.e., integrated circuit) that has a unique embedded identity document (EID) that identifies the SIM chip.

A pSIM has a number of drawbacks, relative to an eSIM, including the need for a physical receptor in the UE that increases the risk of mechanical damage to the UE and may increase the size of the UE form factor. However, a pSIM does have a notable advantage over an eSIM, at least currently: A pSIM may be moved among UEs with relative ease by consumers. Sharing SIMS among UEs is common in some scenarios, such as when a cellular customer has an extra UE with a pSIM, and a foreign visitor arrives, who prefers to have a temporary local phone number (for incoming and outgoing calls) and does not want to pay roaming charges for data use with a foreign network's SIM.

SUMMARY

The following summary is provided to illustrate examples disclosed herein, but is not meant to limit all examples to any particular configuration or sequence of operations.

Solutions are disclosed that provide for sharing embedded subscriber identity modules (eSIMs) among multiple user equipment (UE). Examples receive, into a first UE having a first subscriber identity module (SIM) chip, a first eSIM, wherein the first SIM chip has a first embedded identity document (EID), wherein the first eSIM has a first integrated circuit card identifier (ICCID), and wherein a first mobile station international subscriber directory number (MSISDN) is associated with the first eSIM; identify, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID; move the first eSIM from the first UE to the second UE while preserving the first ICCID for the first eSIM and preserving the association of the first MSISDN with the first eSIM, wherein moving the first eSIM from the first UE to the second UE comprises: removing the first eSIM from the first UE and receiving the first eSIM into the second UE; and based on at least a trigger event, move the first eSIM back from the second UE to the first UE while preserving the first ICCID for the first eSIM and preserving the association of the first MSISDN with the first eSIM, wherein moving the first eSIM from the second UE to the first UE comprises: removing the first eSIM from the second UE and again receiving the first eSIM into the first UE.

Additional examples associate each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a first eSIM profile, and wherein the plurality of eSIMs includes a first eSIM associated with the first eSIM profile and a first MSISDN; identify, in each eSIM profile of the plurality of eSIM profiles, an ICCID of the associated eSIM and a set of authorized UEs for the associated eSIM; receive the first eSIM, from a storage, into an authorized UE of the first eSIM while preserving the ICCID for the first eSIM and preserving the association of the first MSISDN with the first eSIM; and based on at least a trigger event, remove the first eSIM from the authorized UE of the first eSIM and retaining in the storage while preserving the ICCID for the first eSIM and preserving the association of the first MSISDN with the first eSIM.

BRIEF DESCRIPTION OF THE DRAWINGS

The disclosed examples are described below with reference to the accompanying drawing figures listed below, wherein.

Figure 1:
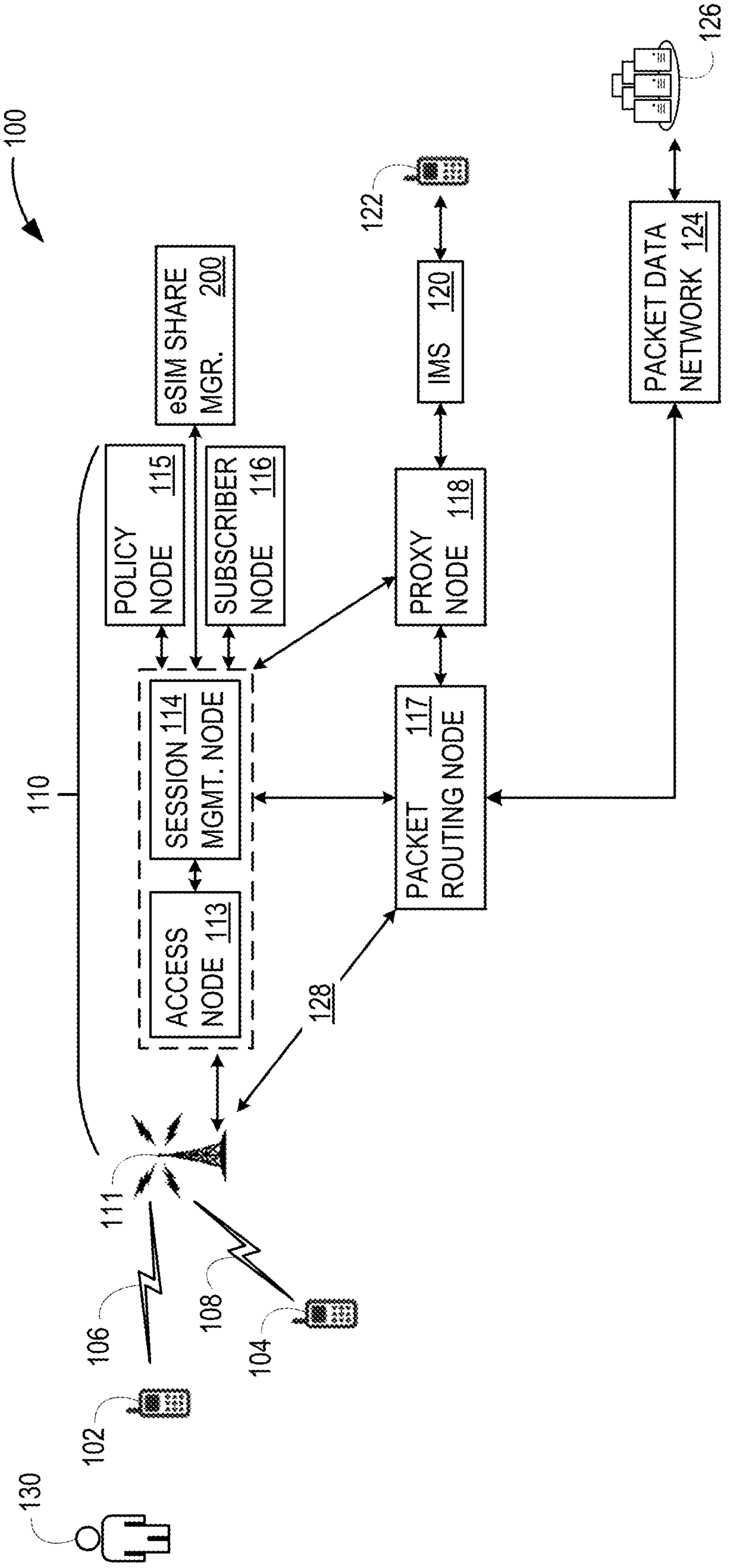
FIG. 1 illustrates an exemplary architecture that advantageously provides a framework for sharing embedded subscriber identity modules (eSIMs) among multiple user equipment (UE)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Embedded subscriber identity modules (eSIMs) may be shared among multiple user equipment (UE). Each UE has a SIM chip, such as an embedded universal integrated circuit card (eUICC) chip, which has a unique embedded identity document (EID), and each eSIM has a unique integrated circuit card identifier (ICCID) and an associated mobile station international subscriber directory number (MSISDN, e.g., phone number). When the eSIMs are moved among UEs, the ICCID remains consistent for the eSIM, and the MSISDN may also remain consistently associated with a particular eSIM. Each eSIM has an associated profile that identifies authorized UEs that have permission to employ that eSIM, and may further identify usage restrictions (e.g., data usage, authorized networks and/or geographical limits) and a state, such as "in use" (when in a UE) and "not in use" when in storage. Organizations may maintain a pool of eSIMs, with the eSIMs moved among employees based on travel assignments and/or need for a company-provided phone.

Aspects of the disclosure improve the efficiency of providing wireless services, by enabling a wireless network to permit sharing of eSIMs. These advantageous results are accomplished, at least in part, by identifying, in an eSIM profile associated with an eSIM, a first UE and a second UE as authorized UEs for the eSIM, and moving the eSIM from the first UE to the second UE while preserving the ICCID for the eSIM.

With reference now to the figures, FIG. 1 illustrates an exemplary architecture 100 that advantageously provides for seamless sharing of eSIMs among multiple UEs. A wireless network 110 is illustrated that is serving a UE 102 and (at a later time) a UE 104. Each of UE 102 and UE 104 may be an enhanced mobile broadband (eMBB) or cellphone, a fixed wireless access (FWA), internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 106 to communicate with a base station 111 of wireless network 110, such that base station 111 is the serving base station for UE 102 (providing the serving cell), and UE 104 uses an air interface 108 to communicate with a base station 111. In some scenarios, base station 111 may be referred to as a radio access network (RAN). Wireless network 110 has an access node 113, a session management node 114, a policy node 115, a subscriber node 116, and other components (not shown). Wireless network 110 also has a packet routing node 117 and a proxy node 118. Access node 113, session management node 114, policy node 115, and subscriber node 116 are within a control plane of wireless network 110, and packet routing node 117 is within a data plane (a.k.a. user plane) of wireless network 110.

Base station 111 is in communication with access node 113 and packet routing node 117. Access node 113 is in communication with session management node 114, which is in communication with policy node 115, a subscriber node 116, packet routing node 117, proxy node 118, and an eSIM sharing manager 200 (which is described in relation to FIGS. 2 and 3). Packet routing node 117 is in communication with proxy node 118 and packet data network 124. In some 5G examples, base station 111 comprises a gNodeB (gNB), access node 113 comprises an access mobility function (AMF), session management node 114 comprises a session management function (SMF), policy node 115 comprises a policy control function (PCF), subscriber node 116 comprises a unified data management (UDM), and packet routing node 117 comprises a user plane function (UPF). In some 4G examples, base station 111 comprises an eNodeB (eNB), access node 113 comprises a mobility management entity (MME), session management node 114 comprises a system architecture evolution gateway (SAEGW) control plane (SAEGW-C), policy node 115 comprises a policy and charging rules function (PCRF), subscriber node 116 comprises a home subscriber server (HSS), and packet routing node 117 comprises an SAEGW-user plane (SAEGW-U). In some examples, proxy node 118 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 118 is in communication with an internet protocol (IP) multimedia system (IMS) 120, which uses an access gateway (IMS-AGW) in order to provide connectivity to other wireless (cellular) networks, such as for a call with a UE 122 or a public switched telephone system (PSTN, also known as plain old telephone system, POTS). In some examples, proxy node 118 may be considered to be within IMS 120. UE 102 reaches network resource 126 using packet data network 124 (or IMS 120, in some examples). Data packets of data traffic 128 to/from UE 102 pass through at least base station 111 and packet routing node 117 on their way from/to packet data network 124 or IMS 120 (via proxy node 118).

Figure 2:
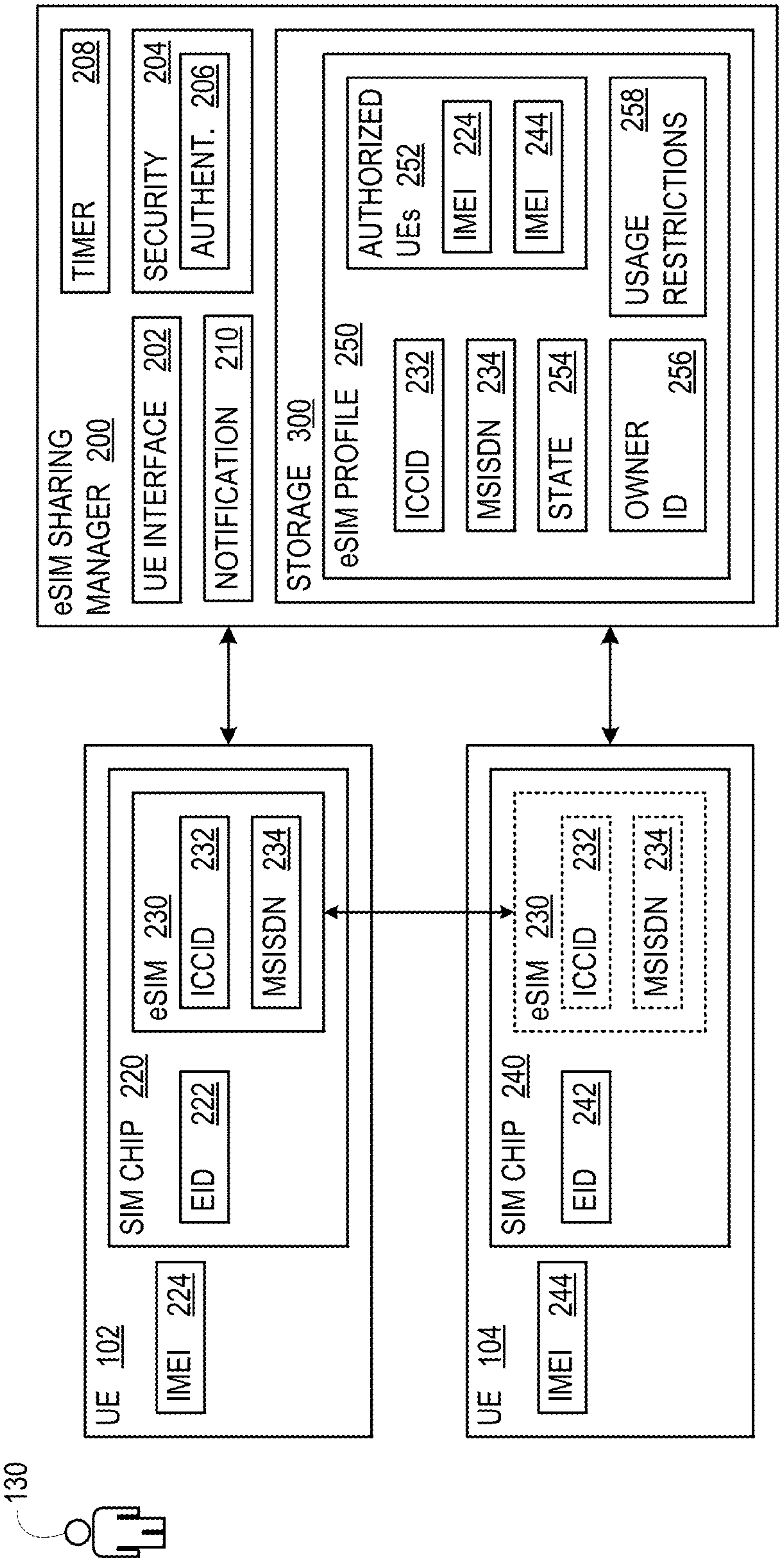
FIG. 2 illustrates further detail for multiple UEs sharing a common eSIM in a first scenario, as may occur when using examples of the architecture of FIG. 1.
Figure 3:
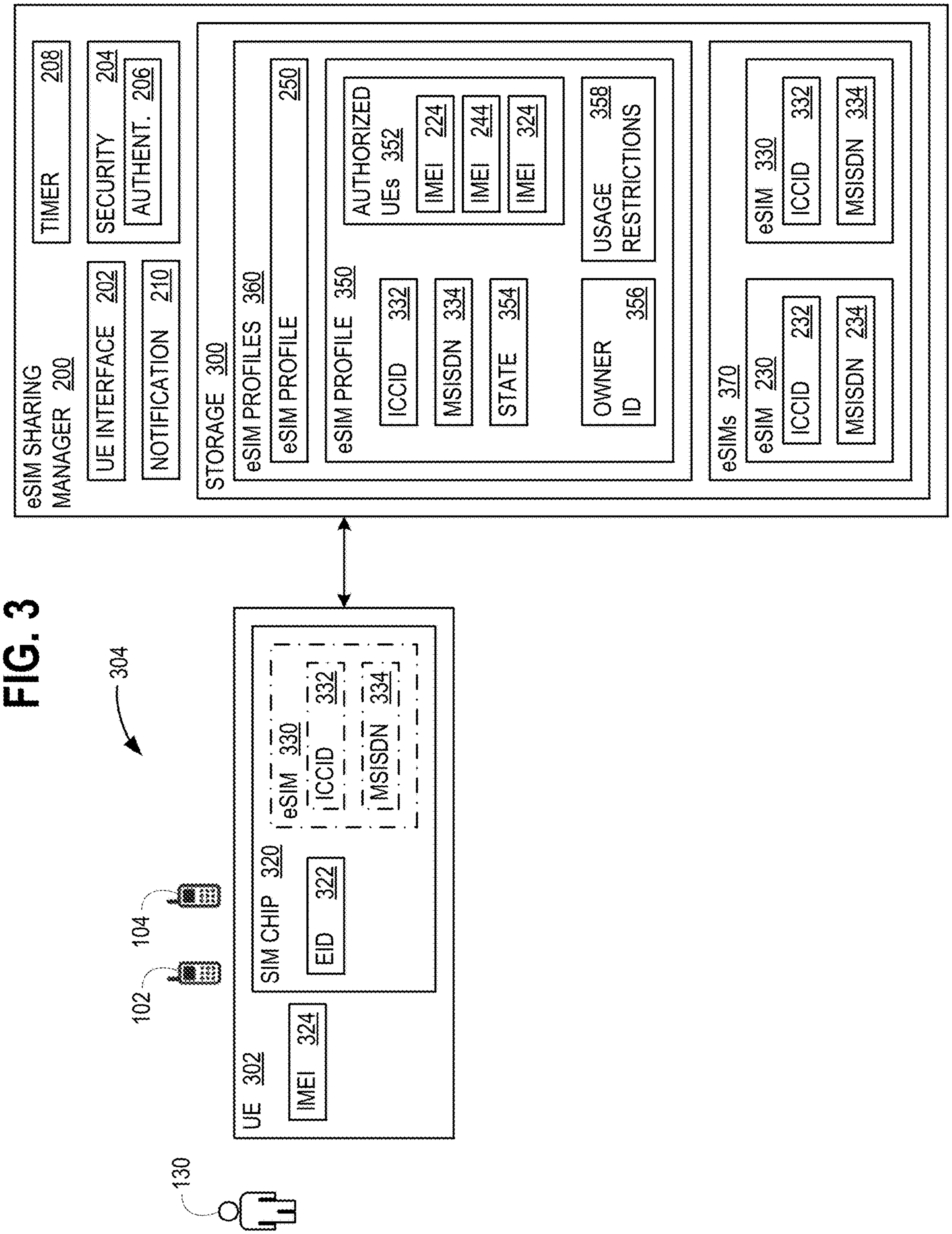
FIG. 3 illustrates further detail for management of a pool of eSIMs that may be shared among a plurality of UEs in a second scenario, as may occur when using examples of the architecture of FIG. 1.
Figure 4:
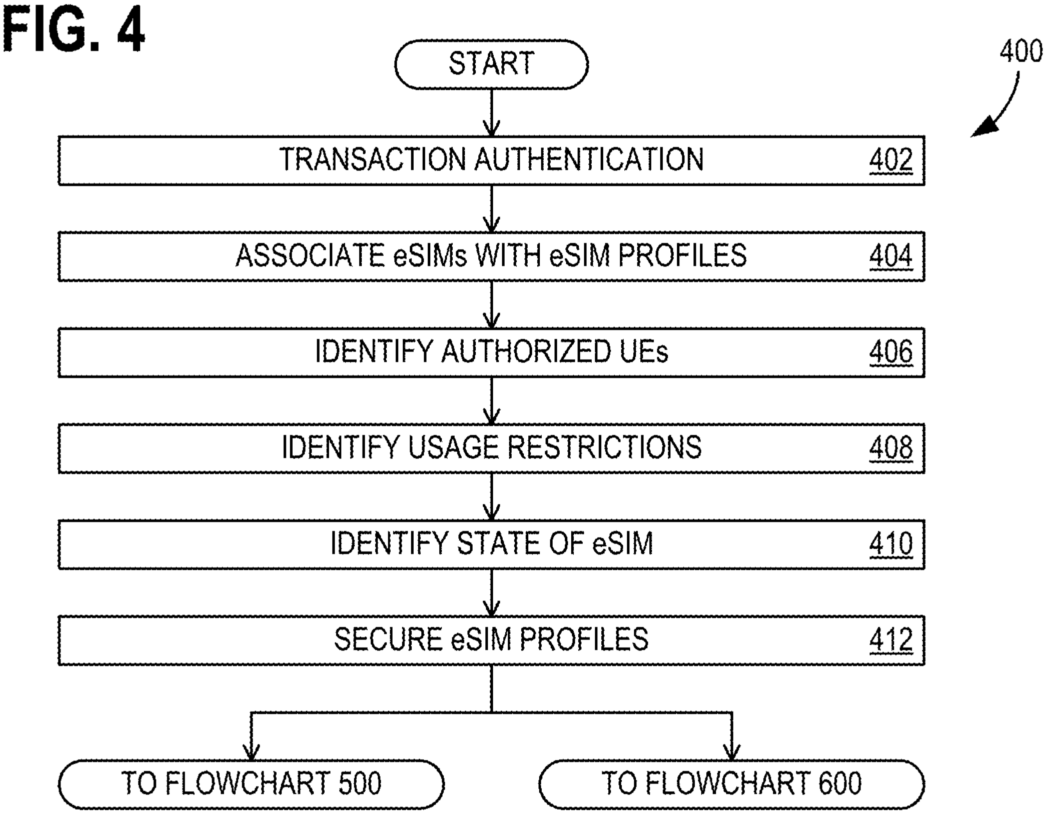
FIGS. 4, 5, and 6 illustrate flowcharts of exemplary operations associated with the scenarios of FIGS. 2 and 3.
Figure 5:
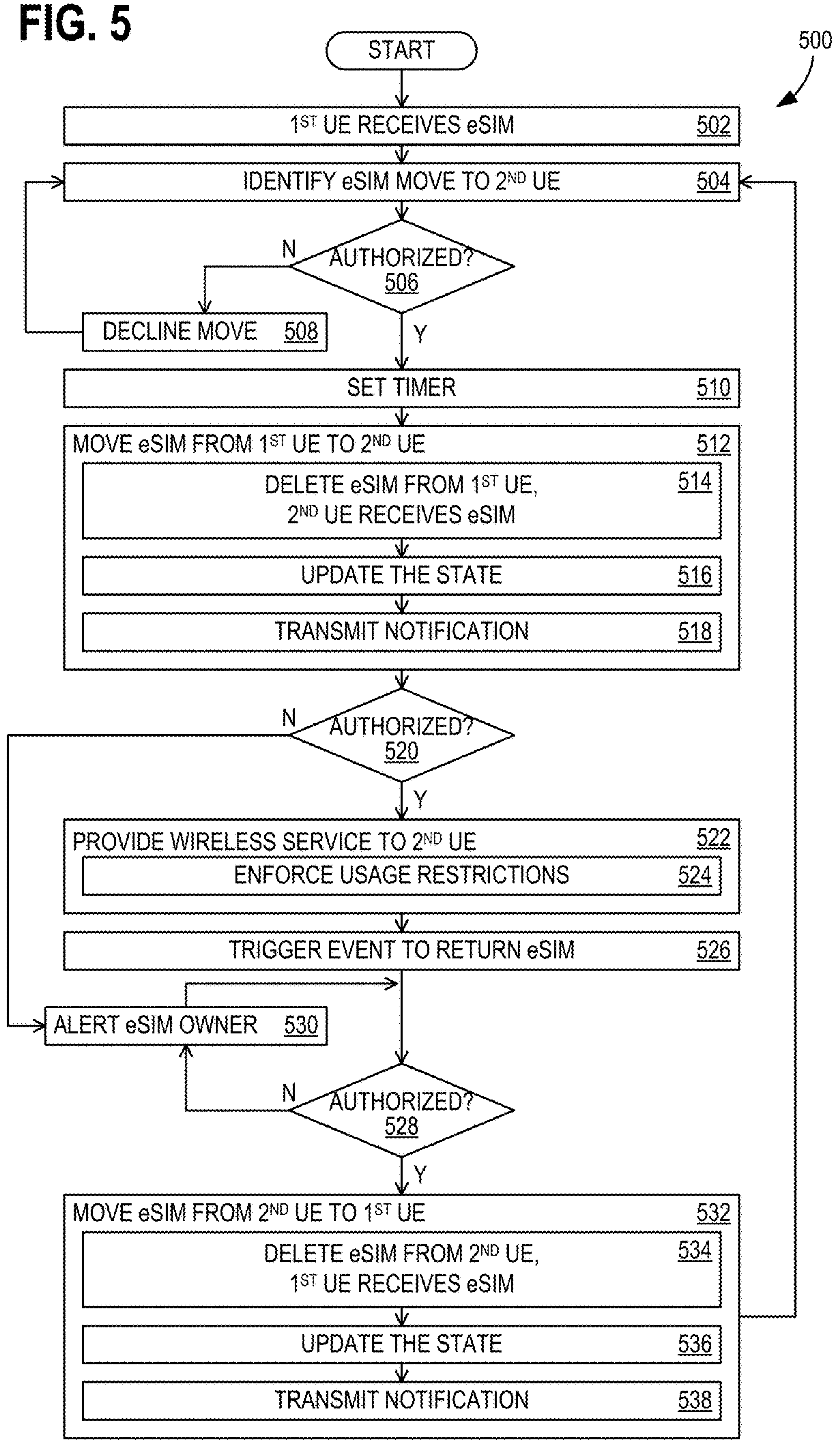
Figure 6:
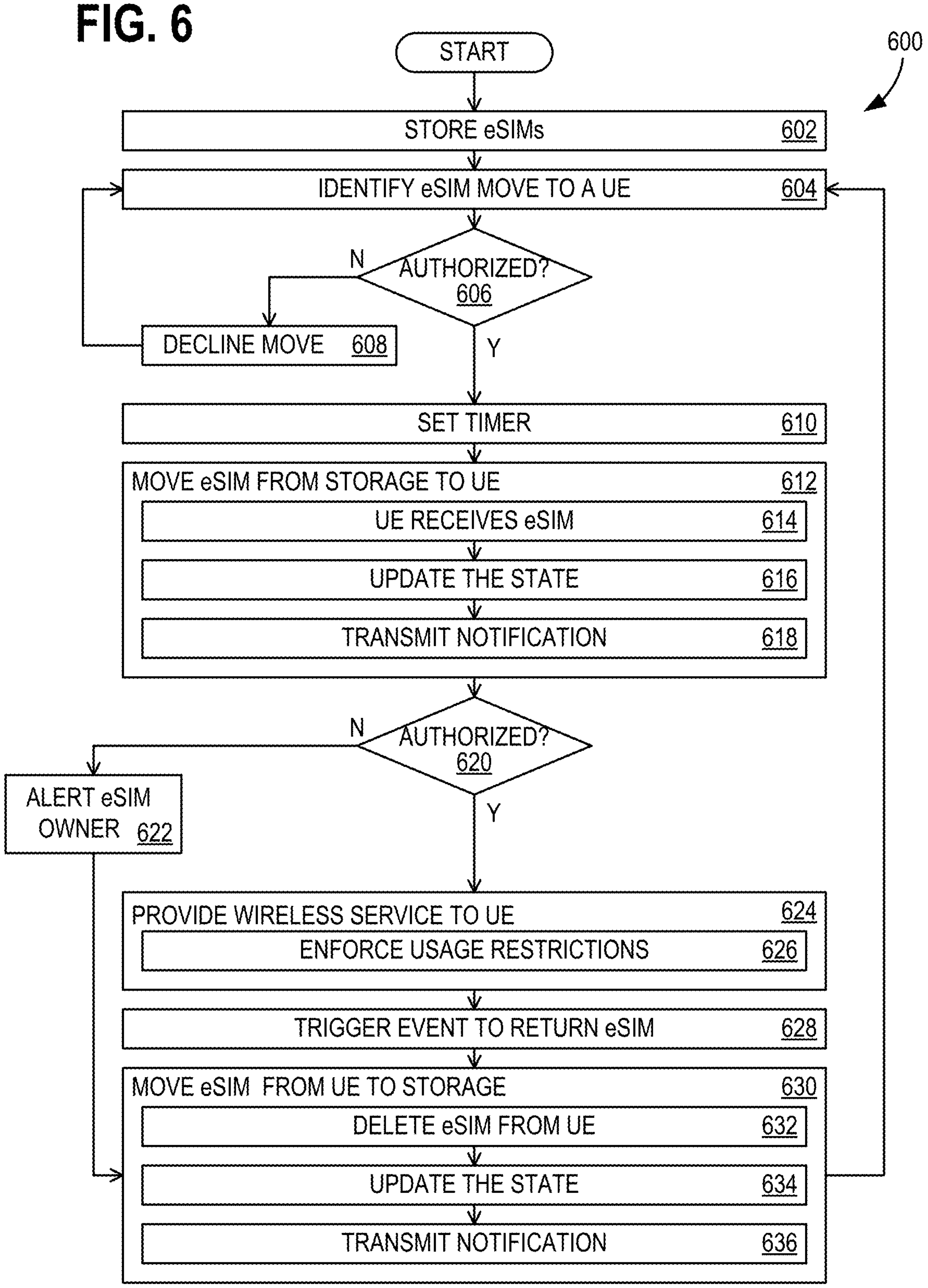

As illustrated in further detail in the remaining figures, and described more fully below in relation to the other figures, eSIM sharing manager 200 permits an authorized account holder 130 to share a single eSIM among UE 102 and UE 104. For example, authorized account holder 130 may have a guest from another country, who needs temporary use of a cellular account while visiting, and has brought along UE 104. Meanwhile, authorized account holder 130 has UE 102 (with an eSIM) as a surplus UE, and so can forego using UE 102 while the guest is visiting. Policy node 115 enforces any usage restrictions on the eSIM (e.g., a geographical limitation, or a network limitation, or a data usage limitation) so that the guest does not run up the cellular account bill excessively, and subscriber node 116 has a database that associates eSIMs (and thus the UE in which the eSIM currently resides) with MSISDNs (e.g., phone numbers). This way, the guest's UE 104 has the phone number previously used by UE 102 while using the common eSIM. FIGS. 2 and 3 illustrate further detail for different scenarios, and FIGS. 4-6 show flowcharts of operations associated with the different scenarios.

Although FIG. 1 and some of the following figures are described using an example of a cellular network, it should be understood that the teachings herein are applicable to other types of wireless networks. To benefit from the teachings herein, another wireless network, other than a cellular network, should identify UEs and manage services for UEs using a data component within each UE that has properties similar to an eSIM. With such features, another type of wireless network, other than a cellular network, may also benefit from the disclosure herein.

FIG. 2 illustrates further detail for multiple UEs sharing a common eSIM in a single user scenario, using an example of architecture 100. UE 102 has an international mobile equipment identity (IMEI) 224 that uniquely identifies UE 102, and a SIM chip 220 with an EID 222 that uniquely identifies SIM chip 220. Initially, an eSIM 230 is within SIM chip 220, and has an ICCID 232 and an MSISDN 234. An association between eSIM 230 and MSISDN 234 is also stored in subscriber node 116, so that wireless network knows to send incoming (mobile terminating, MT) calls, with a dialed phone number matching MSISDN 234, to whichever UE is registered with wireless network 110 and identifies itself as containing eSIM 230.

At a later time, as described in relation to FIG. 5, eSIM 230 is moved to UE 104, which has an IMEI 244 that uniquely identifies UE 104, and a SIM chip 240 with an EID 242 that uniquely identifies SIM chip 240. In some examples, the eSIM chips are embedded universal integrated circuit card (eUICC) chip, the IMEIs are unique 15-digit codes, the EIDs are unique 32-digit codes, and the ICCIDs are unique 18 or 19 digit codes.

Sharing eSIM 230 among UE 102 and 104 is facilitated by eSIM sharing manager 200, which is disposed somewhere (possible distributed) within wireless network 110, and has a UE interface 202 that manages pushing eSIM 230 to a UE, removing (deleting) eSIM 230 from a UE, receiving a transaction authentication 206 from authorized account holder 130 (to ensure eSIM 230 is not stolen or misused), and pushing a notification 210 to from authorized account holder 130, alerting when eSIM 230 is moved from UE 102 to UE 104 or from UE 104 to UE 102. Additionally, eSIM sharing manager 200 also has a timer 208, which is used to trigger moving eSIM 230 back to UE 102, in some situations, and a security component 204 that ensures transaction authentication 206 is correct and provides for encryption and decryption of an eSIM profile 250. In some examples, transaction authentication 206 uses multi-factor authentication.

Further, eSIM sharing manager 200 has a storage 300, which stores eSIM profile 250, and may also store eSIM 230 itself, if eSIM 230 is not in use within UE 102 or UE 104 (or any other UE). ICCID 232 is stored within eSIM profile 250, to associate eSIM profile 250 with eSIM 230, along with MSISDN 234 and a set of authorized UEs 252, that are authorized to employ eSIM 230. Authorized UEs 252 may be identified using IMEIs, such as IMEI 224 and IMEI 244 that indicate UE 102 and UE 104, respectively. A state 254 indicates the location of eSIM 230 (i.e., within UE 102, UE 104, or storage 300) and whether eSIM 230 is in use (within UE 102 or UE 104), or not in use (when only within storage 300, and not within any UE). An owner identifier (ID) 256 indicates authorized account holder 130 and contact information for transmitting notification 210.

Usage restrictions 258 indicate restrictions on the use of eSIM 230, such as a geographical limitation, or a network limitation, or a data usage limitation. In some examples, usage restrictions 258 are UE-specific, such that UE 102 has more freedom to use expansive roaming connections and more data usage, whereas a guest using eSIM 230 in UE 104 is more tightly constrained in roaming and data usage.

FIG. 3 illustrates a scenario in which authorized account holder 130 manages a pool of eSIMs, i.e., a plurality of UEs 304 for some organization, such as an enterprise that has a large number of employees who engage in foreign travel and need company-provided cellphones. An employee (or member) of the organization may "check out" an eSIM from a plurality of eSIMs 370 when traveling. The eSIMs may be provisioned in a way that provides the organization with a carefully selected service and cost balance.

Plurality of UEs 304 includes UE 102, UE 104, and a UE 302. UE 302 has an IMEI 324 that uniquely identifies UE 302, and a SIM chip 320 with an EID 322 that uniquely identifies SIM chip 320. As will be described in relation to FIG. 5, an eSIM 330 is loaded into a SIM chip 220, and which has an ICCID 332 and an MSISDN 334. An association between eSIM 330 and MSISDN 334 is also stored in subscriber node 116.

Sharing plurality of eSIMs 370 among plurality of UEs 304 is facilitated by eSIM sharing manager 200, which is similarly configured as described in FIG. 2, although with more eSIM profiles and more eSIMs. Storage 300 holds a plurality of eSIM profiles 360, each of which is associated with an eSIM of plurality of eSIMs 370. For example, plurality of eSIM profiles 360 has at least eSIM profile 250 and an eSIM profile 350, and plurality of eSIMs 370 has at least eSIM 230 and eSIM 330, in which eSIM 230 is associated with eSIM profile 250 (as described above), and eSIM 330 is associated with eSIM profile 350.

ICCID 332 is stored within eSIM profile 350, to associate eSIM profile 350 with eSIM 330, along with MSISDN 334 and a set of authorized UEs 352, that are authorized to employ eSIM 330. Authorized UEs 352 may be identified using IMEIs, such as IMEI 324, IMEI 244, and IMEI 324 that indicate UE 102, UE 104, and UE 302, respectively. A state 354 indicates the location of eSIM 330 (i.e., within UE 102, UE 104, or storage 300) and whether eSIM 330 is in use (within one of authorized UEs 352), or not in use (when only within storage 300, and not within any UE). Owner ID 356 indicates authorized account holder 130 and contact information for transmitting notification 210. Usage restrictions 358 indicate restrictions on the use of eSIM 330, such as a geographical limitation, or a network limitation, or a data usage limitation. In some examples, usage restrictions 358 are UE-specific.

FIG. 4 illustrates a flowchart 400 of exemplary operations associated with examples of architecture 100. In some examples, at least a portion of flowchart 400 may be performed using one or more computing devices 900 of FIG. 9. Flowchart 400 commences with receiving transaction authentication 206 from authorized account holder 130 in operation 402. Operation 404 associates each of plurality of eSIM profiles 360 with an eSIM of plurality of eSIMs 370, such as by identifying (inserting) the ICCIDs of the eSIMs in the corresponding (associated) eSIM profiles.

In operation 406, authorized account holder 130 identifies a set of authorized UEs (e.g., authorized UEs 252 or 352) for the associated eSIM, in each eSIM profile of plurality of eSIM profiles 360. In operation 408, authorized account holder 130 identifies usage restrictions (e.g., usage restrictions 258 or 358) for the associated eSIM, in each eSIM profile of plurality of eSIM profiles 360. In operation 410, eSIM sharing manager 200 identifies the state (e.g., state 254 or 354) of the associated eSIM, such as in use or not in use, and/or the location (i.e., within a specific UE, or in storage 300). In operation 412, security component 204 encrypts each eSIM profile.

Based upon the scenario, for example a single user with a single eSIM to share, or an organization managing a pool of eSIMs, flowchart 400 then moves to either flowchart 500 of FIG. 5 (single eSIM) or flowchart 600 of FIG. 6 (multiple eSIMs).

FIG. 5 illustrates a flowchart 500 of exemplary operations associated with examples of architecture 100. In some examples, at least a portion of flowchart 500 may be performed using one or more computing devices 900 of FIG. 9. Flowchart 500 commences with UE 102 receiving eSIM 230 in operation 502. UE 104 is identified as the next recipient for eSIM 230 in operation 504. In some examples, wireless network 110 verifies that UE 104 is an authorized UE for eSIM 230, using eSIM profile 250, in decision operation 506, and prior to moving eSIM 230 from UE 102 to UE 104. If UE 104 is not an authorized UE for eSIM 230, wireless network 110 declines to move eSIM 230 in operation 508, and flowchart 500 returns to operation 504 to have another UE identified.

If, however, UE 104 is an authorized UE for eSIM 230, timer 208 is set in operation 510 for the default time to return eSIM 230 to UE 102, if the return is not initiated earlier (or upon some other trigger event). Operation 512 moves eSIM 230 from UE 102 to UE 104, while preserving ICCID 232 for eSIM 230 and preserving the association of MSISDN 234 with eSIM 230, and using operation 514-518. Operation 514 removes eSIM 230 from UE 102 and eSIM 230 is received into UE 104. Operation 516 updates state 254 of eSIM 230 (i.e., the location now being UE 104), and operation 518 transmits notification 210 to authorized account holder 130, which is the recipient that is associated with (identified within) eSIM profile 250.

In some examples (such as those that do not perform decision operation 506 prior to moving eSIM 230), wireless network 110 uses eSIM profile 250 to verify that that UE 104 is an authorized UE for eSIM 230, in decision operation 520, prior to providing wireless services to UE 104. This way, if eSIM 230 is stolen, it cannot be used. If UE 104 is not an authorized UE for eSIM 230, authorized account holder 130 is alerted in operation 530, and flowchart 500 advances to decision operation 528 to start the process of returning eSIM 230 to UE 102.

If, however, UE 104 is an authorized UE for eSIM 230, wireless network 110 provides wireless services to UE 104 in operation 522, which may involve enforcing usage restrictions 258 (found in associated eSIM profile 250), in operation 524. A trigger event, such as lapse of timer 208, occurs in operation 526 to trigger the return of eSIM 230 to UE 102. In some examples, authorized account holder 130 triggers the return of eSIM 230 to UE 102 manually, or uses another mechanism, in operation 526.

In some examples, wireless network 110 verifies that UE 102 is an authorized UE for eSIM 230, using eSIM profile 250, in decision operation 528, and prior to moving eSIM 230 from UE 104 to UE 102. If UE 102 is not an authorized UE for eSIM 230, wireless network 110 alerts authorized account holder 130 in operation 530 so that authorized account holder 130 can remedy the issue, and flowchart 500 returns to decision operation 528.

If, however, UE 102 is an authorized UE for eSIM 230, operation 532 moves eSIM 230 from UE 104 to UE 102, while preserving ICCID 232 for eSIM 230 and preserving the association of MSISDN 234 with eSIM 230, and using operation 534-538. Operation 534 removes eSIM 230 from UE 104 and eSIM 230 is received into UE 102. Operation 536 updates state 254 of eSIM 230 (i.e., the location now being UE 102), and operation 538 transmits notification 210 to authorized account holder 130. Flowchart 500 then returns to operation 504 for the next transfer of eSIM 230.

FIG. 6 illustrates a flowchart 600 of exemplary operations associated with examples of architecture 100. In some examples, at least a portion of flowchart 600 may be performed using one or more computing devices 900 of FIG. 9. Flowchart 600 commences with plurality of eSIMs 370 being moved into storage 300 in operation 602. Operation 604 identifies that eSIM 330 is to be moved into UE 302. In some examples, wireless network 110 verifies that UE 302 is an authorized UE for eSIM 330, using eSIM profile 350, in decision operation 606, and prior to moving eSIM 330 from storage 300 to UE 302. If UE 302 is not an authorized UE for eSIM 330, wireless network 110 declines to move eSIM 330 in operation 608, and flowchart 600 returns to operation 604 to have another UE identified.

If, however, UE 302 is an authorized UE for eSIM 330, timer 208 is set in operation 610 for the default time to return eSIM 330 to storage 300, if the return is not initiated earlier (or upon some other trigger event). Operation 612 moves eSIM 330 from storage 300 to UE 302, while preserving ICCID 332 for eSIM 330 and preserving the association of MSISDN 334 with eSIM 330, and using operation 614-618. UE 302 receives eSIM 330 in operation, and in some examples, a copy of eSIM 330 may remain within storage 300. Operation 616 updates state 354 of eSIM 330 (i.e., in use, and the location now being UE 302), and operation 618 transmits notification 210 to authorized account holder 130, which is the recipient that is associated with (identified within) eSIM profile 350.

In some examples (such as those that do not perform decision operation 606 prior to moving eSIM 330), wireless network 110 uses eSIM profile 350 to verify that UE 302 is an authorized UE for eSIM 330, in decision operation 620, prior to providing wireless services to UE 302. This way, if eSIM 330 is stolen, it cannot be used. If UE 302 is not an authorized UE for eSIM 330, authorized account holder 130 is alerted in operation 622, and flowchart 600 advances to operation 630 to start the process of returning eSIM 330 to storage 300.

If, however, UE 302 is an authorized UE for eSIM 330, wireless network 110 provides wireless services to UE 302 in operation 624, which may involve enforcing usage restrictions 358 (found in associated eSIM profile 350), in operation 626. A trigger event, such as lapse of timer 208, occurs in operation 628 to trigger the return of eSIM 330 to storage 300. In some examples, authorized account holder 130 triggers the return of eSIM 330 to storage 300 manually, or uses another mechanism, in operation 628.

Operation 630 moves eSIM 330 from UE 302 back to storage 300, while preserving ICCID 332 for eSIM 330 and preserving the association of MSISDN 334 with eSIM 330, and using operation 632-636. Operation 632 removes eSIM 330 from UE 302 and eSIM 330 is moved into storage 300, unless a copy of eSIM 330 had been retained in storage 300. Operation 634 updates state 354 of eSIM 330 (i.e., not in use, and the location now being storage 300), and operation 636 transmits notification 210 to authorized account holder 130. Flowchart 600 then returns to operation 604 for the next transfer of eSIM 330 or another eSIM of plurality of eSIMs 370.

Figure 7:
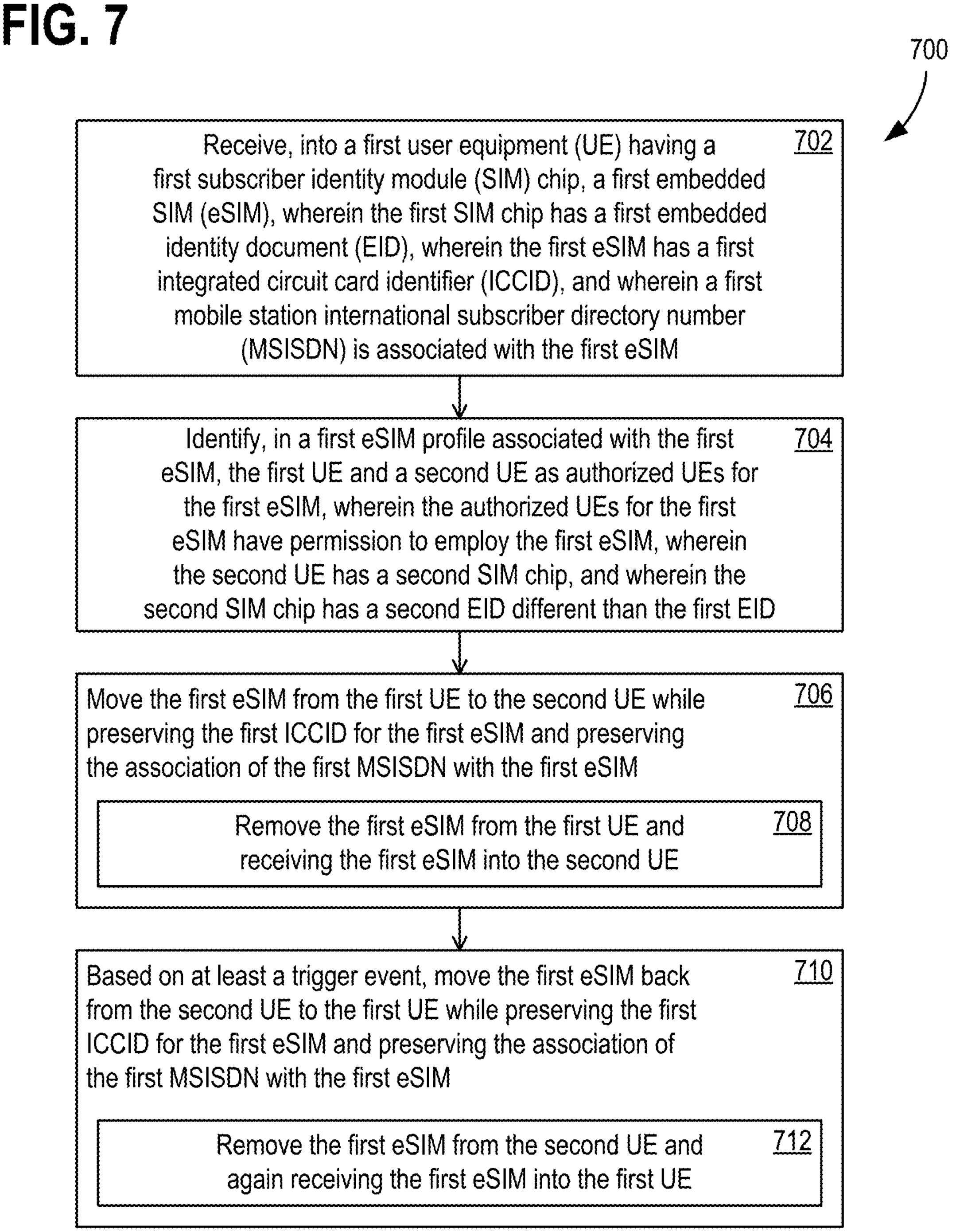
FIGS. 7 and 8 illustrate additional flowcharts of exemplary operations associated with the architecture of FIG. 1.

FIG. 7 illustrates a flowchart 700 of exemplary operations associated with architecture 100. In some examples, at least a portion of flowchart 700 may be performed using one or more computing devices 900 of FIG. 9. Flowchart 700 commences with operation 702, which includes receiving, into a first UE having a first SIM chip, a first eSIM, wherein the first SIM chip has a first EID, wherein the first eSIM has a first ICCID, and wherein a first MSISDN is associated with the first eSIM. Operation 704 includes identifying, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID.

Operation 706 includes moving the first eSIM from the first UE to the second UE while preserving the first ICCID for the first eSIM and preserving the association of the first MSISDN with the first eSIM. Operation 706 is performed using operation 708, which includes removing the first eSIM from the first UE and receiving the first eSIM into the second UE. Operation 710 includes, based on at least a trigger event, moving the first eSIM back from the second UE to the first UE while preserving the first ICCID for the first eSIM and preserving the association of the first MSISDN with the first eSIM. Operation 710 is performed using operation 712, which includes removing the first eSIM from the second UE and again receiving the first eSIM into the first UE.

Figure 8:
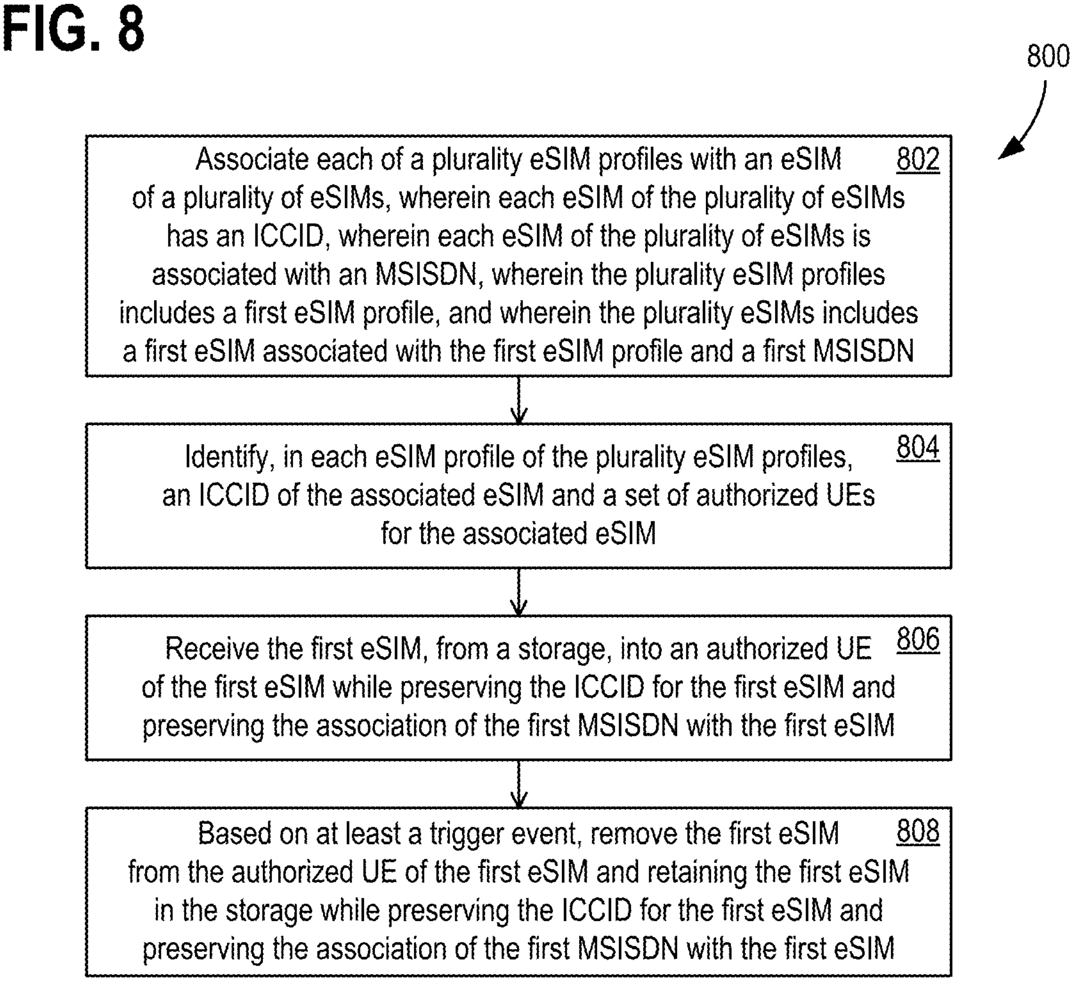

FIG. 8 illustrates a flowchart 800 of exemplary operations associated with architecture 100. In some examples, at least a portion of flowchart 800 may be performed using one or more computing devices 900 of FIG. 9. Flowchart 800 commences with operation 802, which includes associating each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a first eSIM profile, and wherein the plurality of eSIMs includes a first eSIM associated with the first eSIM profile and a first MSISDN.

Operation 804 includes identifying, in each eSIM profile of the plurality of eSIM profiles, an ICCID of the associated eSIM and a set of authorized UEs for the associated eSIM. Operation 806 includes receiving the first eSIM, from a storage, into an authorized UE of the first eSIM while preserving the ICCID for the first eSIM and preserving the association of the first MSISDN with the first eSIM. Operation 808 includes, based on at least a trigger event, removing the first eSIM from the authorized UE of the first eSIM and retaining in the storage while preserving the ICCID for the first eSIM and preserving the association of the first MSISDN with the first eSIM.

Figure 9:
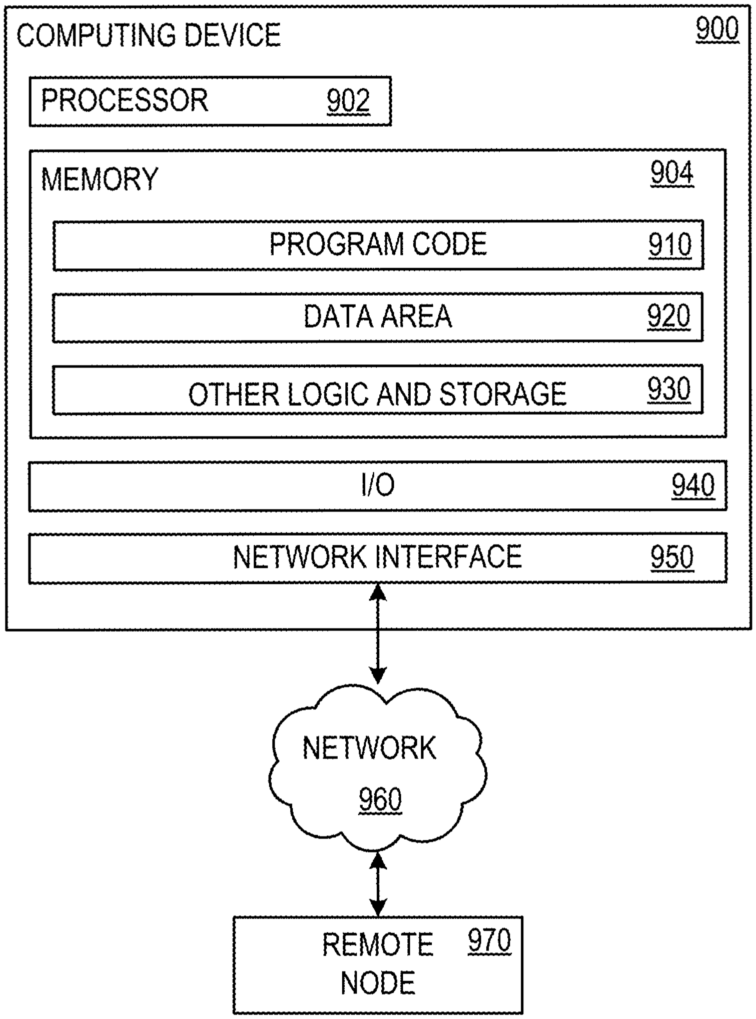
FIG. 9 illustrates a block diagram of a computing device suitable for implementing various aspects of the disclosure.

FIG. 9 illustrates a block diagram of computing device 900 that may be used as any component described herein that may require computational or storage capacity. Computing device 900 has at least a processor 902 and a memory 904 that holds program code 910, data area 920, and other logic and storage 930. Memory 904 is any device allowing information, such as computer executable instructions and/or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including instructions used to perform operations described herein. Data area 920 holds data used to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices. A network interface 950 permits communication over external network 960 with a remote node 970, which may represent another implementation of computing device 900. For example, a remote node 970 may represent another of the above-noted nodes within architecture 100.

Additional Examples

An example system comprises: a processor; and a computer-readable medium storing instructions that are operative upon execution by the processor to: receive, into a first UE having a first SIM chip, a first eSIM, wherein the first SIM chip has a first EID, wherein the first eSIM has a first ICCID, and wherein a first MSISDN is associated with the first eSIM; identify, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID; move the first eSIM from the first UE to the second UE while preserving the first ICCID for the first eSIM and preserving the association of the first MSISDN with the first eSIM, wherein moving the first eSIM from the first UE to the second UE comprises: removing the first eSIM from the first UE and receiving the first eSIM into the second UE; and based on at least a trigger event, move the first eSIM back from the second UE to the first UE while preserving the first ICCID for the first eSIM and preserving the association of the first MSISDN with the first eSIM, wherein moving the first eSIM from the second UE to the first UE comprises: removing the first eSIM from the second UE and again receiving the first eSIM into the first UE.

An example method of wireless communication comprises: receiving, into a first UE having a first SIM chip, a first eSIM, wherein the first SIM chip has a first EID, wherein the first eSIM has a first ICCID, and wherein a first MSISDN is associated with the first eSIM; identifying, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID; moving the first eSIM from the first UE to the second UE while preserving the first ICCID for the first eSIM and preserving the association of the first MSISDN with the first eSIM, wherein moving the first eSIM from the first UE to the second UE comprises: removing the first eSIM from the first UE and receiving the first eSIM into the second UE; and based on at least a trigger event, moving the first eSIM back from the second UE to the first UE while preserving the first ICCID for the first eSIM and preserving the association of the first MSISDN with the first eSIM, wherein moving the first eSIM from the second UE to the first UE comprises: removing the first eSIM from the second UE and again receiving the first eSIM into the first UE.

One or more example computer storage devices has computer-executable instructions stored thereon, which, upon execution by a computer, cause the computer to perform operations comprising: receiving, into a first UE having a first SIM chip, a first eSIM, wherein the first SIM chip has a first EID, wherein the first eSIM has a first ICCID, and wherein a first MSISDN is associated with the first eSIM; identifying, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID; moving the first eSIM from the first UE to the second UE while preserving the first ICCID for the first eSIM and preserving the association of the first MSISDN with the first eSIM, wherein moving the first eSIM from the first UE to the second UE comprises: removing the first eSIM from the first UE and receiving the first eSIM into the second UE; and based on at least a trigger event, moving the first eSIM back from the second UE to the first UE while preserving the first ICCID for the first eSIM and preserving the association of the first MSISDN with the first eSIM, wherein moving the first eSIM from the second UE to the first UE comprises: removing the first eSIM from the second UE and again receiving the first eSIM into the first UE.

Another example system comprises: a processor; and a computer-readable medium storing instructions that are operative upon execution by the processor to: associate each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a first eSIM profile, and wherein the plurality of eSIMs includes a first eSIM associated with the first eSIM profile and a first MSISDN; identify, in each eSIM profile of the plurality of eSIM profiles, an ICCID of the associated eSIM and a set of authorized UEs for the associated eSIM; receive the first eSIM, from a storage, into an authorized UE of the first eSIM while preserving the ICCID for the first eSIM and preserving the association of the first MSISDN with the first eSIM; and based on at least a trigger event, remove the first eSIM from the authorized UE of the first eSIM and retaining in the storage while preserving the ICCID for the first eSIM and preserving the association of the first MSISDN with the first eSIM.

Another example method of wireless communication comprises: associating each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a first eSIM profile, and wherein the plurality of eSIMs includes a first eSIM associated with the first eSIM profile and a first MSISDN; identifying, in each eSIM profile of the plurality of eSIM profiles, an ICCID of the associated eSIM and a set of authorized UEs for the associated eSIM; receiving the first eSIM, from a storage, into an authorized UE of the first eSIM while preserving the ICCID for the first eSIM and preserving the association of the first MSISDN with the first eSIM; and based on at least a trigger event, removing the first eSIM from the authorized UE of the first eSIM and retaining in the storage while preserving the ICCID for the first eSIM and preserving the association of the first MSISDN with the first eSIM.

One or more additional example computer storage devices has computer-executable instructions stored thereon, which, upon execution by a computer, cause the computer to perform operations comprising: associating each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a first eSIM profile, and wherein the plurality of eSIMs includes a first eSIM associated with the first eSIM profile and a first MSISDN; identifying, in each eSIM profile of the plurality of eSIM profiles, an ICCID of the associated eSIM and a set of authorized UEs for the associated eSIM; receiving the first eSIM, from a storage, into an authorized UE of the first eSIM while preserving the ICCID for the first eSIM and preserving the association of the first MSISDN with the first eSIM; and based on at least a trigger event, removing the first eSIM from the authorized UE of the first eSIM and retaining in the storage while preserving the ICCID for the first eSIM and preserving the association of the first MSISDN with the first eSIM.

Alternatively, or in addition to the other examples described herein, examples include any combination of the following:

- the wireless network comprises a cellular network;
- setting a timer, wherein the trigger event comprises a lapse of the timer;
- prior to identifying the second UE as an authorized UEs for the first eSIM in the first eSIM profile, receiving a transaction authentication from an authorized account holder;
- prior to providing, by a wireless network, at least some wireless services to the second UE, verifying, by the wireless network, using the first eSIM profile, that the second UE is an authorized UE for the first eSIM;
- prior to moving the first eSIM from the first UE to the second UE, verifying, by the wireless network, using the first eSIM profile, that the second UE is an authorized UE for the first eSIM;
- prior to moving the first eSIM back from the second UE to the first UE, verifying, by the wireless network, using the first eSIM profile, that the first UE is an authorized UE for the first eSIM;
- associating each of a plurality of eSIM profiles with an eSIM of a plurality of eSIMs;
- each eSIM of the plurality of eSIMs has an ICCID;
- each eSIM of the plurality of eSIMs is associated with an MSISDN;
- the plurality of eSIM profiles includes a second eSIM profile;
- the plurality of eSIMs includes a second eSIM associated with the second eSIM profile and a second MSISDN;
- identifying, in each eSIM profile of the plurality of eSIM profiles, an ICCID of the associated eSIM and a set of authorized UEs for the associated eSIM;
- moving the second eSIM from a storage into an authorized UE of the second eSIM while preserving the ICCID for the second eSIM and preserving the association of the second MSISDN with the second eSIM;
- moving the second eSIM from the authorized UE of the second eSIM to the storage while preserving the ICCID for the second eSIM and preserving the association of the second MSISDN with the second eSIM;
- identifying, in each eSIM profile of the plurality of eSIM profiles, a state of the associated eSIM;
- when an eSIM of the plurality of eSIMs moves from the storage into a UE, updating the state of the eSIM in the associated eSIM profile from not in use to in use;
- when an eSIM of the plurality of eSIMs moves from the storage into a UE, transmitting a notification to a recipient associated with the plurality of eSIM profiles;
- when an eSIM of the plurality of eSIMs moves from a UE into the storage, updating the state of the eSIM in the associated eSIM profile from in use to not in use;
- when an eSIM of the plurality of eSIMs moves from a UE into the storage, transmitting a notification to the recipient;
- identifying, in each eSIM profile, usage restrictions for the associated eSIM, the usage restrictions identifying a geographical limitation, or a network limitation, or a data usage limitation;
- enforcing, by a wireless network, for an eSIM of the plurality of eSIMs, the usage restrictions, using the associated eSIM profile;
- each of the authorized UEs has a SIM chip with an EID;
- each SIM chip comprises an embedded universal integrated circuit card (eUICC) chip;
- each EID is a unique 32-digit code;
- each ICCID is a unique 18 or 19 digit code;
- each of the authorized UEs has an international mobile equipment identity (IMEI);
- each IMEI is a unique 15-digit code;
- each MSISDN comprises a phone number; and each of the authorized UEs may comprise an enhanced mobile broadband (eMBB) device, or a fixed wireless access (FWA) device, or internet of things (IoT) device;

moving the first eSIM from the first UE to the second UE is based on at least the second UE being an authorized UE;

moving the first eSIM back from the second UE to the first UE is based on at least the first UE being an authorized UE;

the transaction authentication requires multi-factor authentication;

the wireless network enforces permissions to employ eSIMs;

the wireless network associates MSISDNs with eSIMs;

encrypting each eSIM profile of the plurality of eSIM profiles; and the eSIM usage restrictions are UE-specific.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

receiving, into a first user equipment (UE) having a first subscriber identity module (SIM) chip, a first embedded SIM (eSIM), wherein the first SIM chip has a first embedded identity document (EID), wherein the first eSIM has a first integrated circuit card identifier (ICCID), and wherein a first mobile station international subscriber directory number (MSISDN) is associated with the first eSIM;

identifying, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID;

moving the first eSIM from the first UE to the second UE while preserving the first ICCID for the first eSIM and preserving the association of the first MSISDN with the first eSIM, wherein moving the first eSIM from the first UE to the second UE comprises:

removing the first eSIM from the first UE and receiving the first eSIM into the second UE; and based on at least a trigger event, moving the first eSIM back from the second UE to the first UE while preserving the first ICCID for the first eSIM and preserving the association of the first MSISDN with the first eSIM, wherein moving the first eSIM from the second UE to the first UE comprises:

removing the first eSIM from the second UE and again receiving the first eSIM into the first UE.

2. The method of claim 1, further comprising:

setting a timer, wherein the trigger event comprises a lapse of the timer.

3. The method of claim 1, further comprising:

prior to identifying the second UE as an authorized UEs for the first eSIM in the first eSIM profile, receiving a transaction authentication from an authorized account holder; and either:

prior to providing, by a wireless network, at least some wireless services to the second UE, verifying, by the wireless network, using the first eSIM profile, that the second UE is an authorized UE for the first eSIM;

or:

prior to moving the first eSIM from the first UE to the second UE, verifying, by the wireless network, using the first eSIM profile, that the second UE is an authorized UE for the first eSIM; and prior to moving the first eSIM back from the second UE to the first UE, verifying, by the wireless network, using the first eSIM profile, that the first UE is an authorized UE for the first eSIM.

4. The method of claim 1, further comprising:

associating each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a second eSIM profile, and wherein the plurality of eSIMs includes a second eSIM associated with the second eSIM profile and a second MSISDN;

identifying, in each eSIM profile of the plurality of eSIM profiles, an ICCID of the associated eSIM and a set of authorized UEs for the associated eSIM;

moving the second eSIM from a storage into an authorized UE of the second eSIM while preserving the ICCID for the second eSIM and preserving the association of the second MSISDN with the second eSIM; and moving the second eSIM from the authorized UE of the second eSIM to the storage while preserving the ICCID for the second eSIM and preserving the association of the second MSISDN with the second eSIM.

5. The method of claim 4, further comprising:

identifying, in each eSIM profile of the plurality of eSIM profiles, a state of the associated eSIM;

when an eSIM of the plurality of eSIMs moves from the storage into a UE:

updating the state of the eSIM in the associated eSIM profile from not in use to in use; and transmitting a notification to a recipient associated with the plurality of eSIM profiles; and when an eSIM of the plurality of eSIMs moves from a UE into the storage:

updating the state of the eSIM in the associated eSIM profile from in use to not in use; and transmitting a notification to the recipient.

6. The method of claim 4, further comprising:

identifying, in each eSIM profile, usage restrictions for the associated eSIM, the usage restrictions identifying a geographical limitation, or a network limitation, or a data usage limitation; and enforcing, by a wireless network, for an eSIM of the plurality of eSIMs, the usage restrictions, using the associated eSIM profile.

7. The method of claim 1, wherein each of the authorized UEs has a SIM chip with an EID;

wherein each SIM chip comprises an embedded universal integrated circuit card (eUICC) chip;

wherein each EID is a unique 32-digit code;

wherein each ICCID is a unique 18 or 19 digit code;

wherein each of the authorized UEs has an international mobile equipment identity (IMEI);

wherein each IMEI is a unique 15-digit code;

wherein each MSISDN comprises a phone number; and wherein each of the authorized UEs may comprise an enhanced mobile broadband (eMBB) device, or a fixed wireless access (FWA) device, or internet of things (IoT) device.

8. A system comprising:

a processor; and a computer-readable medium storing instructions that are operative upon execution by the processor to:

receive, into a first user equipment (UE) having a first subscriber identity module (SIM) chip, a first embedded SIM (eSIM), wherein the first SIM chip has a first embedded identity document (EID), wherein the first eSIM has a first integrated circuit card identifier (ICCID), and wherein a first mobile station international subscriber directory number (MSISDN) is associated with the first eSIM;

identify, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID;

move the first eSIM from the first UE to the second UE while preserving the first ICCID for the first eSIM and preserving the association of the first MSISDN with the first eSIM, wherein moving the first eSIM from the first UE to the second UE comprises:

removing the first eSIM from the first UE and receiving the first eSIM into the second UE; and based on at least a trigger event, move the first eSIM back from the second UE to the first UE while preserving the first ICCID for the first eSIM and preserving the association of the first MSISDN with the first eSIM, wherein moving the first eSIM from the second UE to the first UE comprises:

removing the first eSIM from the second UE and again receiving the first eSIM into the first UE.

9. The system of claim 8, wherein the instructions are further operative to:

set a timer, wherein the trigger event comprises a lapse of the timer.

10. The system of claim 8, wherein the instructions are further operative to:

prior to identifying the second UE as an authorized UEs for the first eSIM in the first eSIM profile, receive a transaction authentication from an authorized account holder; and either:

prior to providing, by a wireless network, at least some wireless services to the second UE, verify, by the wireless network, using the first eSIM profile, that the second UE is an authorized UE for the first eSIM;

or:

prior to moving the first eSIM from the first UE to the second UE, verify, by the wireless network, using the first eSIM profile, that the second UE is an authorized UE for the first eSIM; and prior to moving the first eSIM back from the second UE to the first UE, verify, by the wireless network, using the first eSIM profile, that the first UE is an authorized UE for the first eSIM.

11. The system of claim 8, wherein the instructions are further operative to:

associate each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a second eSIM profile, and wherein the plurality of eSIMs includes a second eSIM associated with the second eSIM profile and a second MSISDN;

identify, in each eSIM profile of the plurality of eSIM profiles, an ICCID of the associated eSIM and a set of authorized UEs for the associated eSIM;

move the second eSIM from a storage into an authorized UE of the second eSIM while preserving the ICCID for the second eSIM and preserving the association of the second MSISDN with the second eSIM; and move the second eSIM from the authorized UE of the second eSIM to the storage while preserving the ICCID for the second eSIM and preserving the association of the second MSISDN with the second eSIM.

12. The system of claim 11, wherein the instructions are further operative to:

identify, in each eSIM profile of the plurality of eSIM profiles, a state of the associated eSIM;

when an eSIM of the plurality of eSIMs moves from the storage into a UE:

update the state of the eSIM in the associated eSIM profile from not in use to in use; and transmit a notification to a recipient associated with the plurality of eSIM profiles; and when an eSIM of the plurality of eSIMs moves from a UE into the storage:

update the state of the eSIM in the associated eSIM profile from in use to not in use; and transmit a notification to the recipient.

13. The system of claim 11, wherein the instructions are further operative to:

identify, in each eSIM profile, usage restrictions for the associated eSIM, the usage restrictions identifying a geographical limitation, or a network limitation, or a data usage limitation; and enforce, by a wireless network, for an eSIM of the plurality of eSIMs, the usage restrictions, using the associated eSIM profile.

14. The system of claim 8 wherein each of the authorized UEs has a SIM chip with an EID;

wherein each SIM chip comprises an embedded universal integrated circuit card (eUICC) chip;

wherein each EID is a unique 32-digit code;

wherein each ICCID is a unique 18 or 19 digit code;

wherein each of the authorized UEs has an international mobile equipment identity (IMEI);

wherein each IMEI is a unique 15-digit code;

wherein each MSISDN comprises a phone number; and wherein each of the authorized UEs may comprise an enhanced mobile broadband (eMBB) device, or a fixed wireless access (FWA) device, or internet of things (IoT) device.

15. One or more computer storage devices having computer-executable instructions stored thereon, which, upon execution by a computer, cause the computer to perform operations comprising:

receiving, into a first user equipment (UE) having a first subscriber identity module (SIM) chip, a first embedded SIM (eSIM), wherein the first SIM chip has a first embedded identity document (EID), wherein the first eSIM has a first integrated circuit card identifier (ICCID), and wherein a first mobile station international subscriber directory number (MSISDN) is associated with the first eSIM;

identifying, in a first eSIM profile associated with the first eSIM, the first UE and a second UE as authorized UEs for the first eSIM, wherein the authorized UEs for the first eSIM have permission to employ the first eSIM, wherein the second UE has a second SIM chip, and wherein the second SIM chip has a second EID different than the first EID;

moving the first eSIM from the first UE to the second UE while preserving the first ICCID for the first eSIM and preserving the association of the first MSISDN with the first eSIM, wherein moving the first eSIM from the first UE to the second UE comprises:

removing the first eSIM from the first UE and receiving the first eSIM into the second UE; and based on at least a trigger event, moving the first eSIM back from the second UE to the first UE while preserving the first ICCID for the first eSIM and preserving the association of the first MSISDN with the first eSIM, wherein moving the first eSIM from the second UE to the first UE comprises:

removing the first eSIM from the second UE and again receiving the first eSIM into the first UE.

16. The one or more computer storage devices of claim 15, wherein the operations further comprise:

prior to identifying the second UE as an authorized UEs for the first eSIM in the first eSIM profile, receiving a transaction authentication from an authorized account holder; and either:

prior to providing, by a wireless network, at least some wireless services to the second UE, verifying, by the wireless network, using the first eSIM profile, that the second UE is an authorized UE for the first eSIM;

or:

prior to moving the first eSIM from the first UE to the second UE, verifying, by the wireless network, using the first eSIM profile, that the second UE is an authorized UE for the first eSIM; and prior to moving the first eSIM back from the second UE to the first UE, verifying, by the wireless network, using the first eSIM profile, that the first UE is an authorized UE for the first eSIM.

17. The one or more computer storage devices of claim 15, wherein the operations further comprise:

associating each of a plurality of eSIM profiles with an eSIM of a plurality of eSIMs, wherein each eSIM of the plurality of eSIMs has an ICCID, wherein each eSIM of the plurality of eSIMs is associated with an MSISDN, wherein the plurality of eSIM profiles includes a second eSIM profile, and wherein the plurality of eSIMs includes a second eSIM associated with the second eSIM profile and a second MSISDN;

identifying, in each eSIM profile of the plurality of eSIM profiles, an ICCID of the associated eSIM and a set of authorized UEs for the associated eSIM;

moving the second eSIM from a storage into an authorized UE of the second eSIM while preserving the ICCID for the second eSIM and preserving the association of the second MSISDN with the second eSIM; and moving the second eSIM from the authorized UE of the second eSIM to the storage while preserving the ICCID for the second eSIM and preserving the association of the second MSISDN with the second eSIM.

18. The one or more computer storage devices of claim 17, wherein the operations further comprise:

identifying, in each eSIM profile of the plurality of eSIM profiles, a state of the associated eSIM;

when an eSIM of the plurality of eSIMs moves from the storage into a UE:

updating the state of the eSIM in the associated eSIM profile from not in use to in use; and transmitting a notification to a recipient associated with the plurality of eSIM profiles; and when an eSIM of the plurality of eSIMs moves from a UE into the storage:

updating the state of the eSIM in the associated eSIM profile from in use to not in use; and transmitting a notification to the recipient.

19. The one or more computer storage devices of claim 17, wherein the operations further comprise:

identifying, in each eSIM profile, usage restrictions for the associated eSIM, the usage restrictions identifying a geographical limitation, or a network limitation, or a data usage limitation; and enforcing, by a wireless network, for an eSIM of the plurality of eSIMs, the usage restrictions, using the associated eSIM profile.

20. The one or more computer storage devices of claim 17, wherein each of the authorized UEs has a SIM chip with an EID;

wherein each SIM chip comprises an embedded universal integrated circuit card (eUICC) chip;

wherein each EID is a unique 32-digit code;

wherein each ICCID is a unique 18 or 19 digit code;

wherein each of the authorized UEs has an international mobile equipment identity (IMEI);

wherein each IMEI is a unique 15-digit code;

wherein each MSISDN comprises a phone number; and wherein each of the authorized UEs may comprise an enhanced mobile broadband (eMBB) device, or a fixed wireless access (FWA) device, or internet of things (IoT) device.

* * * * *